April 21, 1970   E. J. FALK   3,507,365
CLOSED LOOP DISC BRAKE AND SHOE RETENTION MEANS
Filed March 3, 1968   4 Sheets-Sheet 1

INVENTOR
EDWARD J. FALK
BY William R. O'Meara

INVENTOR
EDWARD J. FALK
BY William K. O'Meara

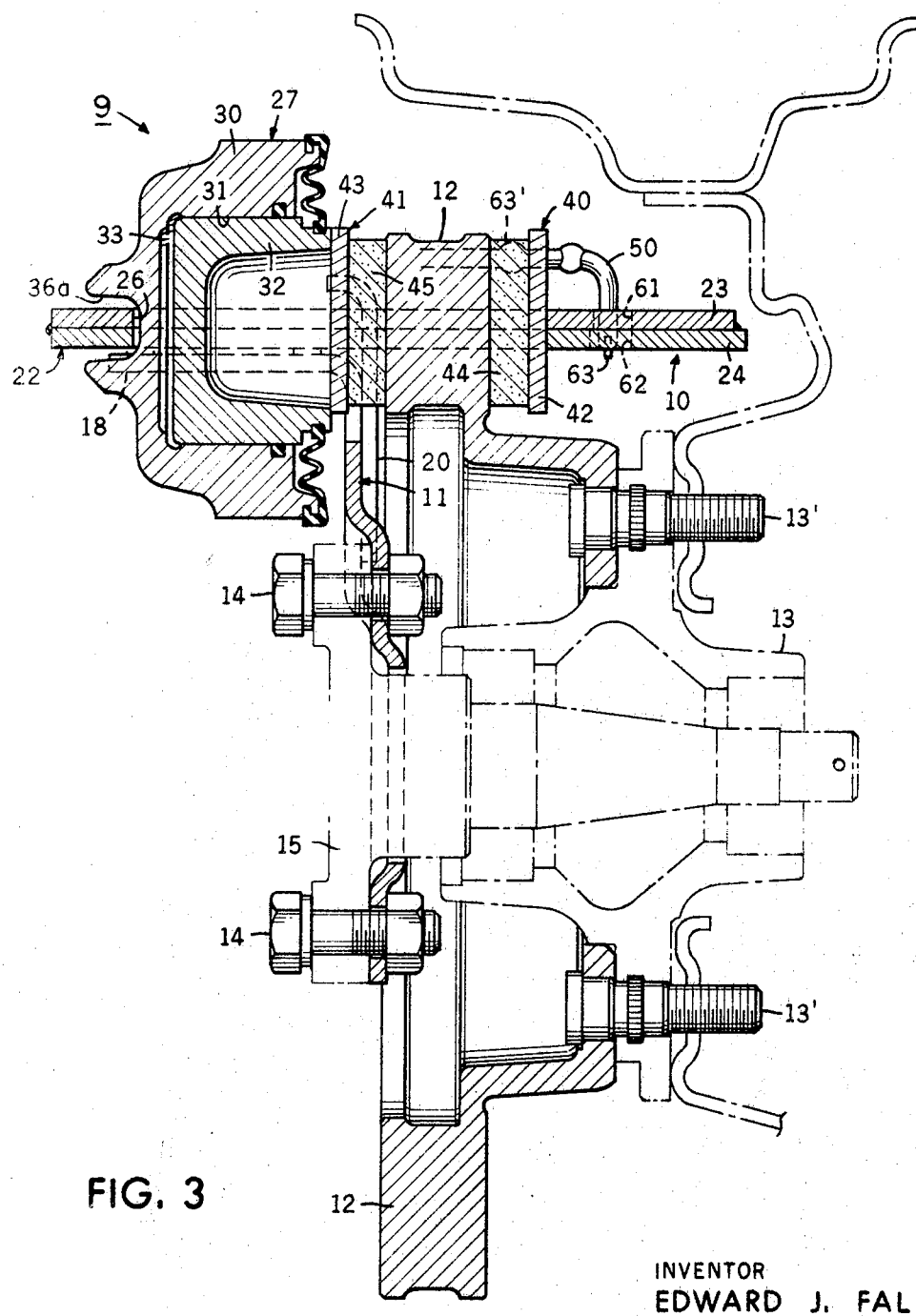

INVENTOR
EDWARD J. FALK

United States Patent Office 3,507,365
Patented Apr. 21, 1970

3,507,365
CLOSED LOOP DISC BRAKE AND SHOE
RETENTION MEANS
Edward J. Falk, St. Louis, Mo., assignor to Wagner Electric Corporation, Newark, N.J., a corporation of Delaware
Filed Mar. 8, 1968, Ser. No. 711,579
Int. Cl. F16d 65/02
U.S. Cl. 188—72.1         5 Claims

ABSTRACT OF THE DISCLOSURE

A disc brake is provided with a closed loop member about a chordal portion of a rotatable disc and movable in a fixed support having a pair of spaced anchors adjacent to one side of said disc. A brake shoe is slidable on said anchors, and a wheel cylinder is carried by said member for moving said member in one direction and said brake shoe in an opposite direction into frictional engagement with said one disc side wherein the torque thereof is transmitted from said brake shoe directly onto one of said anchors independently of said member. Another brake shoe is carried on said member and movable therewith in the one direction into frictional engagement with the other side of said disc wherein the torque thereof is transmitted from said other brake shoe through said member to said wheel cylinder and therefrom onto said one anchor.

This invention relates to friction devices and more particularly to disc brakes.

In the past, certain disc brakes of the type having a caliper frame movable to apply brake shoes against opposed sides of the brake disc had certain disadvantageous or undesirable features. These undesirable features included excessive taper wear and shortened brake shoe life, "rattle" noise, large space requirements, and relatively high cost of manufacture. For example, in some past disc brake constructions, the movable frame had an undesirable amount of freedom of movement in directions other than the desired axial or brake applying direction under dynamic conditions, and this resulted in excessive taper wear of one or both of the brake shoes and shortened brake shoe life, and, in some cases, an undesirable amount of noise. In such past disc brake constructions of the type having a closed loop frame in which a brake actuator or wheel cylinder is utilized to move the inboard brake shoe in one direction against one side of the disc and to move the frame in the opposite direction to, in turn, move the outboard brake shoe against the opposite side of the disc, moments were produced due to the transfer of torque from the outboard shoe to the frame that tended to rotate the frame in its own plane, and which resulted in excessive taper wear on the outboard shoe due to excessive freedom of angular movement or rotation of the frame as a result of manufacturing tolerances and stresses on parts of the brake.

An object of the present invention is to provide a disc brake which overcomes the aforementioned undesirable or disadvantageous features, and this, as well as other objects and advantageous features of the present invention, will become apparent in the specification which follows.

Briefly, in accordance with one aspect of the present invention, a friction device is provided which includes support means adapted for connection adjacent to rotatable disc means and having a pair of spaced anchor means, a movable member for anchoring engagement with the anchor means and having interconnected portions disposed respectively on opposed sides of the disc, a friction member between one portion and one disc side, another friction member between the other portion and the other disc side, said other portion including actuating means for moving the other friction member in one direction into frictional engagement with the disc and the movable member in the opposite direction to move the first named friction member into frictional engagement with the disc, the torque of the frictional engagement of the friction members being transmitted to one of the anchor means when the disc is rotating in one direction.

Figure 1:
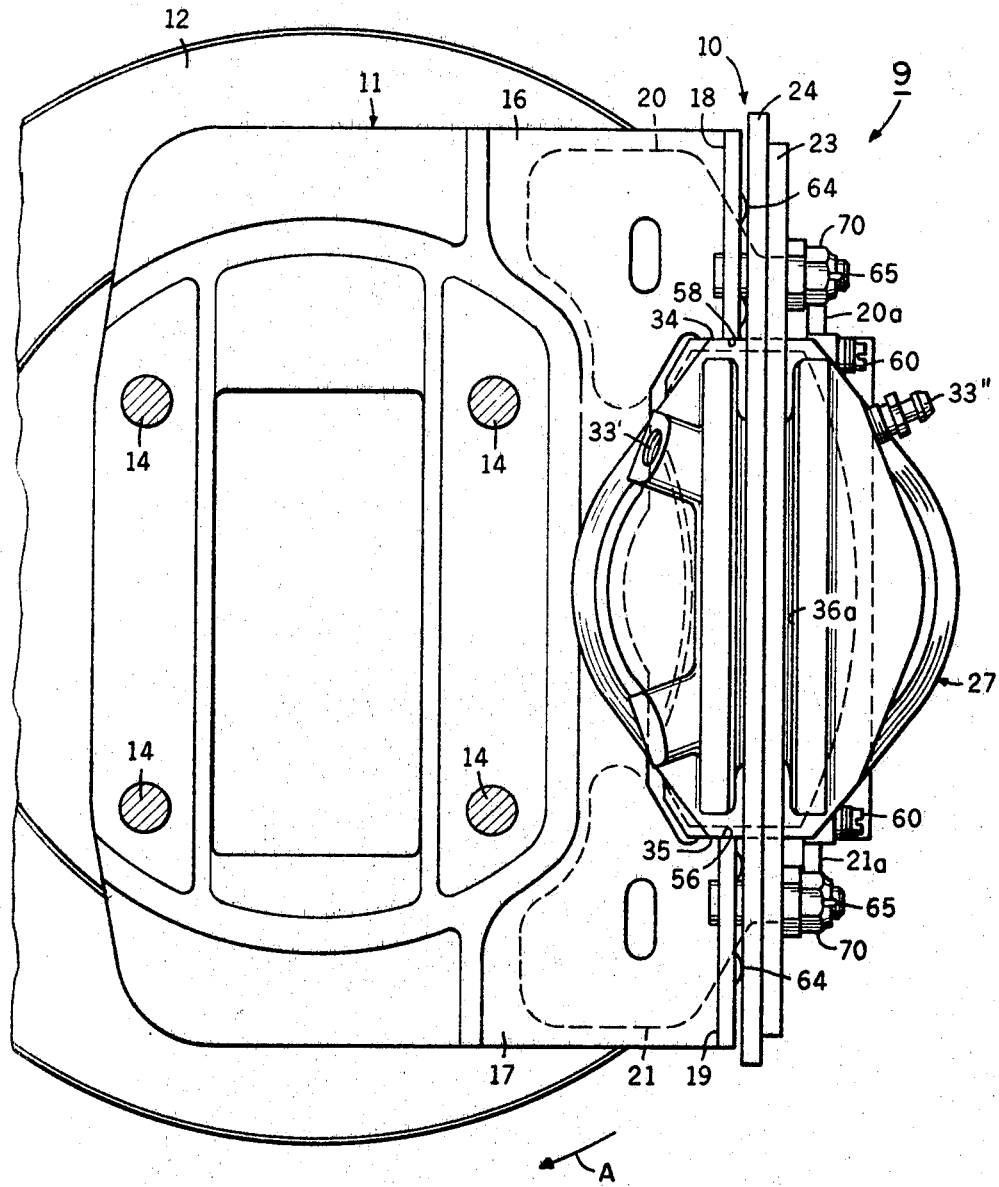
Figure 2:
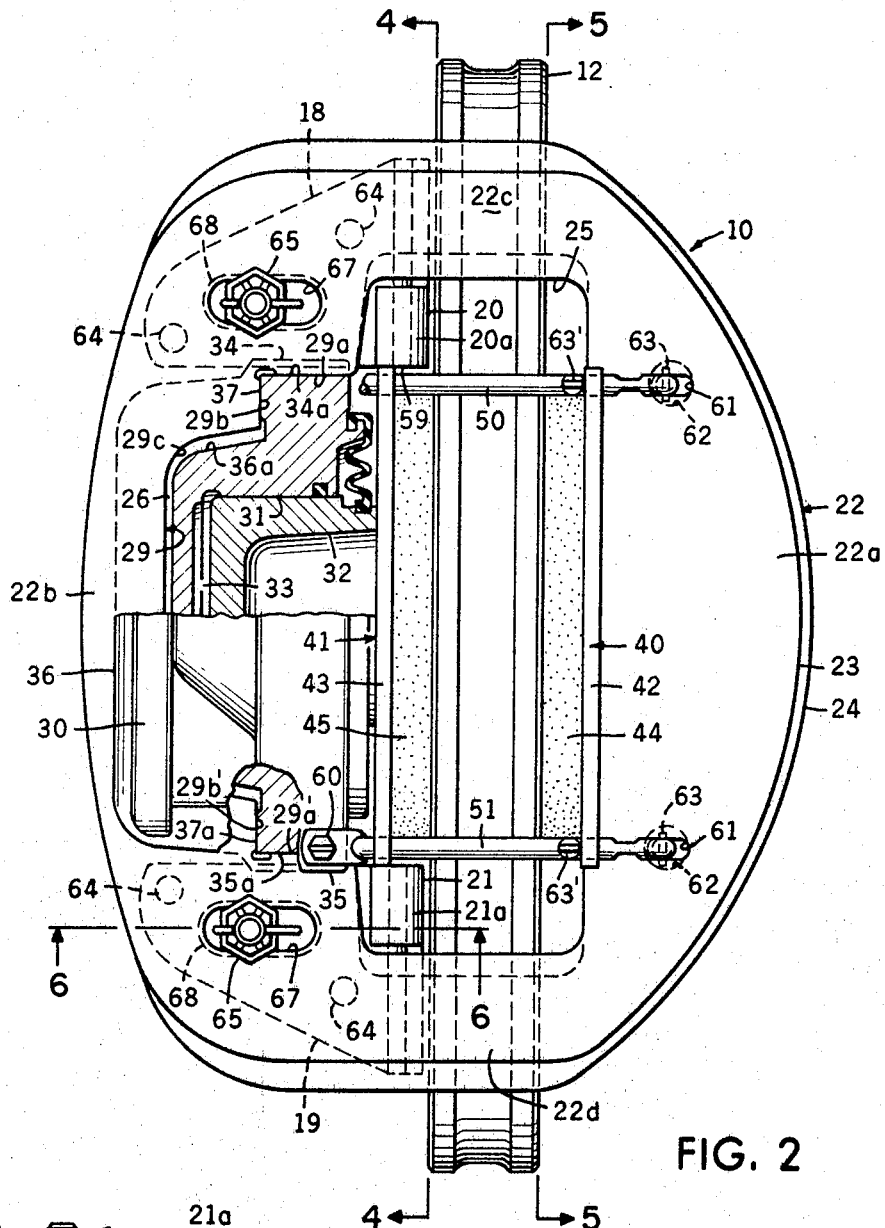
Figure 6:
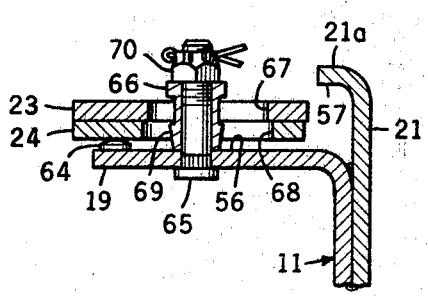
Figures 4, 5:
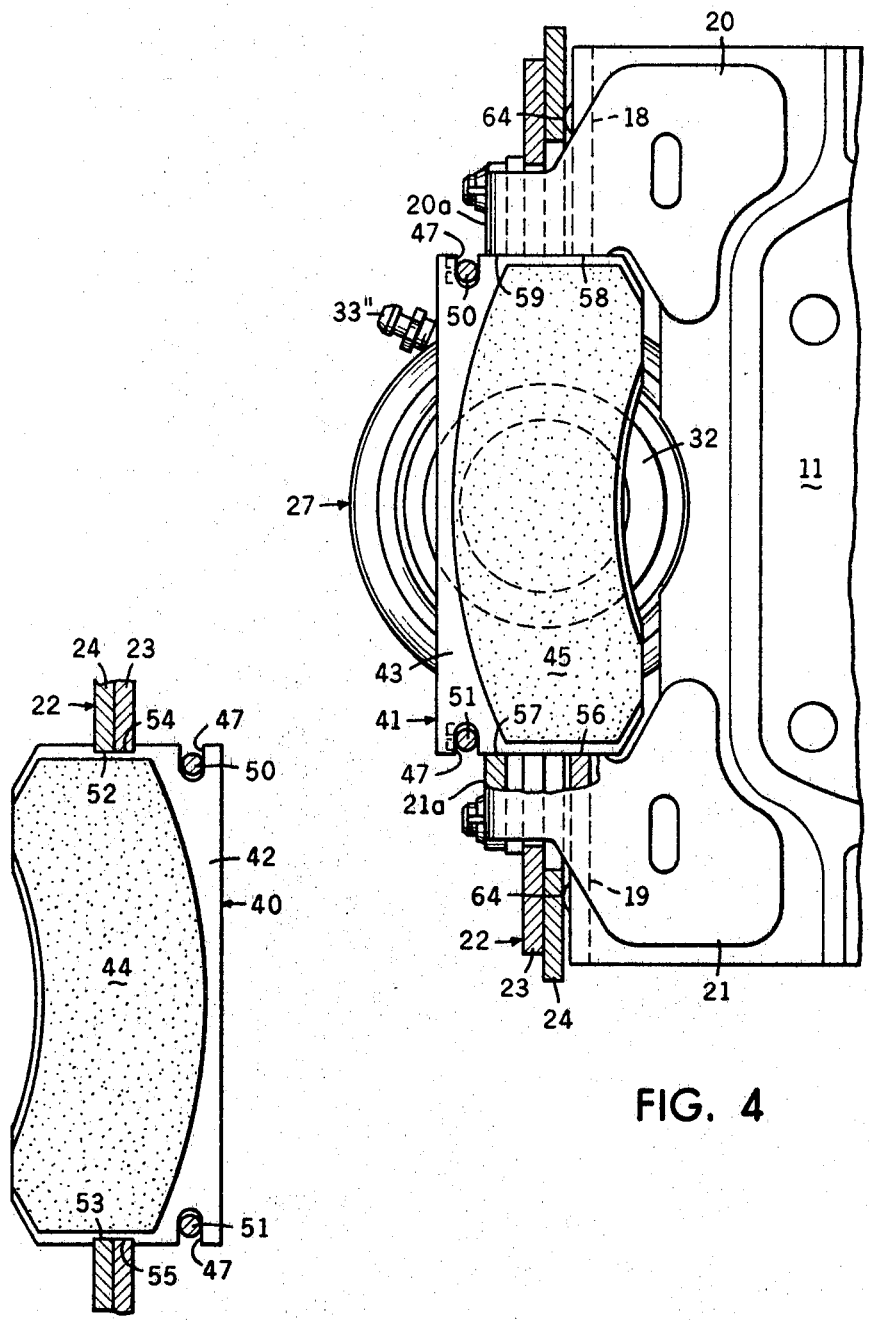

In the drawings which illustrate embodiments of the present invention and wherein like numerals refer to like parts wherever they occur, FIG. 1 is an elevational view of a disc brake according to the present invention, FIG. 2 is a plan view, partly in section, of the brake of FIG. 1, FIG. 3 is a sectional view taken along the line 3—3 of FIG. 2, FIG. 4 is a sectional view taken along the line 4—4 of FIG. 2, FIG. 5 is a sectional view taken along the line 5—5 of FIG. 2, and FIG. 6 is a sectional view taken along line 6—6 of FIG. 2.

Referring now to the drawings and particularly to FIGS. 1–4, there is illustrated a disc brake 9 which includes a disc brake unit, indicated generally at 10, mounted on a nonrotatable support member 11 which extends adjacent one side of a rotor or disc 12 having opposed annular braking surfaces and connected for rotation with a hub 13 (FIG. 3) of a vehicle wheel by a plurality of bolts 13'.

Support member 11 is in the form of a sheet-metal stamping secured by bolts 14 to a stationary part shown as an axle spindle or flange 15. Support member 11 extends parallel to the plane of disc 12 and is provided with a pair of circumferentially spaced arms 16 and 17 (FIG. 1) having flanges 18 and 19, each flange being in a plane normal to the plane of disc 12. Flanges 18 and 19 provide a supporting table for the brake unit 10, as will be explained in greater detail hereinafter. The arms 16 and 17 are provided with a pair of strengthening and torque-taking members 20 and 21, respectively, that are secured, such as by welding, to the upper portions of the arms, members 20 and 21 extending radially upwardly beyond the plane of flanges 18 and 19 and have upper end portions 20a and 21a, respectively, which extend in a plane parallel to the plane of flanges 18 and 19. The flange 18 and member 20 together and the flange 19 and member 21 together define spaced anchors on support 11 for the brake unit 10.

The brake unit 10 includes a movable or sliding beam or frame 22, shown as a closed loop member, extending chordwise of disc 12. The frame 22 has a pressure portion, indicated at 22a, on one side of disc 12 and a reaction portion, indicated at 22b, on the opposite side of disc 12, the pressure and reaction portions 22a and 22b being connected together by end portions 22c and 22d which extend across the outer periphery of disc 12. Frame 22 includes a pair of sheet-metal plates or stampings 23 and 24 secured together, such as by welding, and has formed therein an opening 25 through which a peripheral or chordal portion of disc 12 rotates, and an opening 26 in the reaction portion 22b intersecting opening 25 and in which a brake actuating member 27, shown as a fluid pressure responsive motor or hydraulic wheel cylinder, is secured.

Opening 26 has a peripheral edge 29 (FIG. 2) including a pair of opposed axially extending edge portions 29a and 29a' which intersect the edge of opening 25, edge portions 29b and 29b' connecting with and extending normal to edge portions 29a and 29a', and a curving or cup-shaped bottom edge portion 29c which extends between portions 29b and 29b'.

The wheel cylinder 27 includes a housing 30 having a bore 31 and an actuating piston 32 slidably and sealably engaging the bore and defining therewith an expansible chamber 33 which is provided with a pressure fluid inlet at 33' and a bleeder opening at 33''. The housing 30 has a pair of opposed, axially extending outer side walls 34 and 35 and a rear wall 36 closing one end of bore 31. The walls 34, 35 and 36 are provided with grooves 34a, 35a and 36a, respectively, which receive portions of the peripheral edge 29 of frame 22 to obviate radial movement of the cylinder 27. The rear wall groove 36a extends radially inwardly with respect to the cylinder bore 31 from the grooves 34a and 35a to provide abutments 37 and 37a adjacent the opposed sides of the cylinder housing 30. During assembly, the housing 30 is pressed axially into the opening 26, the opposed peripheral edge portions 29a, 29a' of frame member 22 being a slight press-fit with or frictionally engaging side wall grooves 34a and 35a, respectively. The cylinder 27 is moved axially into opening 26 until the peripheral edge portions 29b and 29b', respectively, engage the abutments 37 and 37a. The housing 30 and frame 22, in some cases, may be integrally formed, if desired.

A pair of like friction members or brake shoes 40, 41 are mounted in facing relation on opposite sides of disc 12 within the opening 25. Brake shoes 40 and 41 include backing plates 42 and 43, respectively, and pads of friction material 44 and 45 respectively secured to the backing plates 42 and 43, such as by rivets or conventional bonding means. As seen also in FIGS. 4 and 5, each of the backing plates 42 and 43 is provided with a pair of slots or grooves 47 formed in the opposed ends thereof which receive mounting or hold-down rods 50 and 51, as will be more fully described hereinafter.

Brake shoe 40 is mounted on pressure portion 22a of frame 22 for movement therewith. The pressure portion 22a has a shallow cut-out or opening with opposed walls 52 and 53 (FIG. 5) which are respectively engageable with the bottom walls of notches 54 and 55 provided in the opposed ends of backing plate 42 to provide torque transmitting connections between the backing plate 42 and frame 22. The other brake shoe 41 is disposed axially between the piston 32 and the disc 12 and circumferentially between arms 16 and 17 of the support member 11, the radially outer portions of the arms providing sliding anchoring or torque-taking connections between the backing plate 43 and the support member 11. As seen in FIGS. 2 and 4, one end of backing plate 43 slidably anchors on portions of arm 17 including inner side 56 of flange 19 and inner side 57 of arm extension 21. Similarly, the other end of backing plate 43 slidably anchors on portions of arm 16 including inner side 58 of flange 18 and inner side 59 of the arm extension 20, as is also apparent in FIG. 3. Thus, the shoe 41 is directly slidably engageable with support member 11 below and above the frame 22.

Each of the mounting rods 50 and 51 is secured to the housing 30 adjacent one end thereof by a screw 60 (FIG. 1) and extends axially across the periphery of disc 12 and through slots 47 of the backing plates 42 and 43. The right ends of rods 50 and 51 curve downwardly, as seen in FIGS. 2 and 3, and extend through elongated slots 61 provided in the plate 23 in the pressure portion 22a of the frame 22. Enlarged holes 62 are provided in the plate 24 respectively in registration with the slots 61. Extension abutments 63 (FIG. 2) are provided on the lower ends of rods 50 and 51 that extend cross-wise the narrow dimensions of slots 61 and engage the lower side of plate 23 to prevent movement of these ends outwardly of the frame 22 when in assembled relation, as shown in the drawings. Another pair of extension abutments 63' are shown on the rods 50 and 51 on the disc side of backing plate 42 to insure that backing plate 40 remains between the torque-transmitting walls 52 and 53 of frame 22. The abutments 63 and 63' are shown as extrusions on the rods 50 and 51. With this arrangement, the brake shoes 40 and 41 are readily inserted and removed from the brake unit 10. For example, by removing the screws 60 from their mounting holes in the housing 30 and moving the left ends of rods 50 and 51 apart, as viewed in FIG. 2, the rods leave the slots 47 of backing plates 42 and 43 and free the brake shoes 40 and 41 for removal. When desired, the rods 50 and 51 may be removed from frame 22 by moving them apart until the abutments 63 extend lengthwise of the longer dimension of slots 61 so that the abutments 63 will pass through slots 61. With the rods 50 and 51 removed from the backing plate slots 47, shoe 40 can be moved slightly toward disc 12 until the slots 54 and 55 (FIG. 5) are free of the frame 22, and then radially outwardly from the brake unit 10. If necessary, the frame 22 can be moved axially rightwardly to provide sufficient space for the removal of shoe 40. The shoe 41 can simply be lifted radially outwardly of the unit 10. With the rods 50 and 51 apart, new brake shoes can be inserted and then the rods 50 and 51 returned to the positions shown in FIG. 2 to hold the new shoes in place.

The brake unit 10 is mounted for axial sliding movement on the flanges 18 and 19 of support member 11. Each of the flanges 18 and 19 is shown provided with a pair of rounded bearing surfaces shown as buttons 64 on which frame 22 is slidable. The buttons 64 are shown as extrusions of the flanges. A pair of mounting studs 65 are respectively press-fitted in openings in the flanges 18 and 19 and extend through spacers 66 that are disposed in registering openings or slots 67 and 68, respectively, in the frame plates 23 and 24 on opposite sides of cylinder 27. The slots 67 and 68 are relatively long in the axial direction, opening 68 being slightly larger than opening 67. As seen in FIG. 6, the spacer 66 is provided with an enlargement 69 which, during assembly, is pressed through opening 67 in the plate 23 and into larger opening 68 in plate 24, whereby the spacer, after insertion, cannot fall out of opening 67. The distance from the bottom of the spacer to the head thereof is greater than the thickness of frame 22 plus the height of the buttons 64 so that when the nuts 70 are tightened down against the heads of the spacer 66, the spacers 66 insure freedom of movement of frame 22 relative to the support member 11.

Referring especially to FIG. 1, the opposed sides 34 and 35 of the housing 30 slidably engage facing sides 56 and 58, respectively, of the flanges 18 and 19, the flanges guiding the brake unit 10 for axial movement. The sides 56 and 58 of flanges 18 and 19 provide anchors or torque-taking connections for the frame 22.

In operation, assuming the disc 12 to be rotating in the forward direction, as indicated by the arrow in FIG. 2, when fluid pressure is supplied to chamber 33 through inlet 33', for example, from a vehicle hydraulic master cylinder (not shown), piston 32 moves rightwardly, as viewed in FIG. 2, to move brake shoe 41 into frictional engagement with one side of disc 12. Thereafter, pressure reaction, i.e., fluid pressure in chamber 33 acting on the cylinder housing 30 after shoe 41 engages disc 12, moves the housing 30 leftwardly applying axial forces on the frame 22 by the engagement between housing abutments 37 and 37a and frame edge portions 29b, 29b' to slide the housing 30 and frame 22 leftwardly whereby the pressure portion 22a moves the brake shoe 40 into frictional engagement with the opposite side of the disc 12. The torque exerted on shoe 41 by disc 12 is taken directly by arm 17 of the support member 11 due to the engagement between backing plate 43 and the flange 19 and extension 21. Torque exerted on shoe 40 by the disc 12 is transmitted to the frame 22 by the engagement between backing plate 42 and the wall 53 (FIG. 5) of the frame 22, and to the upper side wall of groove 34a of housing 30 (FIG. 2) by the engagement thereof with edge portion 29a of the frame, and then through the cylinder housing 30 to the flange 19 of arm 17 of the support member 11 due to the engagement between housing side wall 35 and side 56 of flange 19.

When the disc 12 is rotating in the reverse direction opposite the arrow in FIG. 2 and the brake is actuated, torque exerted on shoe 41 is transmitted directly to flange 18 and extension 20 of arm 16 of the support 11, while torque from shoe 40 is transmitted through the frame 22 to the side wall groove 35a of the housing 30 and thence through the housing to the flange 18 of arm 16 by the engagement between housing side wall 34 and side 58 of flange 18.

The mounting studs 65 and hold-down rods 50, 51 do not take the braking torque in either direction of disc rotation.

It will be apparent that the opposed sides 34 and 35 of the housing 30 and the sides 56 and 58 (FIG. 1) of the flanges 18 and 19 which are slidably engaged by the housing sides 34 and 35 to provide a relatively long guide for the housing 30 and frame 22 of unit 10. The axial length of the surfaces of housing sides 34 and 35 that are in engagement with flange sides 56 and 58 is substantially greater than the thickness of the support 11 and frame 22. Because these engaging guide surfaces between the housing 30 and flanges 18 and 19 of support 11 are relatively long, the amount of freedom of angular movement or rotation of frame 22 in its own plane as a result of manufacturing tolerances and stresses on parts is very small.

Because there is very little or substantially no freedom of rotation of unit 10 including frame 22 relative to support 11, moments produced by the transfer of torque from shoe 40 to the frame 22 tending to angularly move or rotate frame 22 are opposed by support 11 instead of pad 44 to thereby reduce or substantially minimize angular or taper wear of the wear face thereof. Thus, the friction pads 44 and 45 will wear relatively evenly over the wear life thereof.

Also, the relatively long sliding engagement between the housing walls 34 and 35 and flange sides 56 and 58 provide relatively large torque-transferring surfaces for good distribution of the torque transferred from the housing 30 to a flange during braking operations.

From the foregoing, it is now apparent that a novel disc brake meeting the objects and advantageous features set forth hereinbefore, as well as other objects and advantages, is provided and that changes as to the precise configurations, shapes, and details of the construction set forth in the disclosure by way of illustration may be made by those skilled in the art without departing from the spirit of the invention.

The embodiments of the invention in which an exclusive property or privilege is claimed are defined as follows:

1. A disc brake comprising support means adapted to be mounted adjacent to rotatable disc means, a pair of friction members disposed respectively on opposed sides of said disc for frictional engagement therewith, a closed loop member mounted on said support and surrounding a chordal portion of said disc and said friction members and including actuating means for effecting movement of said friction members into frictional engagement with said disc upon actuation of said actuating means, and holding means for said friction members extending across the periphery of said disc and engaging said friction members to limit displacement movement of said friction members radially of said disc but permitting axial movement thereof, said holding means being pivotal to free said friction members for removal from the disc brake and including a pair of rods each connected at one end to said member adjacent one side of said disc and pivotally connected at the other end to said member adjacent the other side of said disc, each of said friction members having grooves receiving said rods, a pair of slots in said member which respectively receive said other ends of said rods, each of said rods being provided with abutment means engageable with said member to prevent removal of the rod from the slot when the rod is in its normal position engaging said friction members, the abutment means being free to pass through the slot upon predetermined pivotal movement of the rod.

2. A friction device for use with a rotatable disc comprising a pair of friction elements for frictional engagement with the opposed sides of said disc, a closed loop member surrounding a chordal portion of said disc and movable axially on said friction device for urging one of said friction elements into frictional engagement with one side of said disc, means normally connecting said one friction element with said member against radial displacement therefrom, actuating means for moving said member and urging said one friction member into frictional engagement with said disc one side and including means drivingly connected with the other of said friction elements to urge said other friction element into frictional engagement with the other side of said disc, a pair of holding means extending across the periphery of said disc and engaged with said other friction element to limit displacement movement thereof radially of said disc, other means on said holding means for respective engagement with said one friction element to normally limit axial displacement movement thereof relative to said member, said holding means each having one opposed end portion releasably secured with said actuating means on a side of said member adjacent to said disc other side, a pair of openings extending through said member on the side thereof adjacent to said disc one side, said holding means each having other opposed end portions respectively received in said openings, and abutment means on said opposed ends normally engageable with said member to prevent removal of said other end portions through said opening when said holding means are engaged with said one and other friction elements to limit displacement movement thereof, respectively, and said holding means being pivotally movable toward positions disengaged from said other friction element and disengaging said other means from said one friction element to permit removal of said one and other friction elements from said friction device and also permit movement of said abutment means through said openings, respectively.

3. A friction device for use with a rotatable disc comprising support means, a pair of friction elements respectively disposed on opposed sides of said disc for frictional engagement therewith, a closed loop member movable on said support means and surrounding said friction elements and a chordal portion of said disc, said member including actuating means for effecting movement of said friction elements into frictional engagement with the opposed sides of said disc, a pair of spaced slot means extending through said member and adjacent to one side of said disc, a pair of holding rods having intermediate portions extending across the periphery of said disc and engaged with at least one of said friction elements to limit displacement movement thereof radially of said disc, a first pair of end portions on said rods integral with one of the ends of said intermediate portions and releasably secured to said member adjacent to the other side of said disc, a second pair of end portions on said rods integral with the other of the ends of said intermediate portions and depending therefrom, said second end portions extending through said slot means, and other means on said second end portions of said rods engageable with said member to prevent removal of said second end portions of said rods through said slot means when said rods are engaged with said one friction element, said rods being pivotally movable substantially about said second end portions toward positions disengaged from said one friction element to permit removal thereof from said friction device and also permit the removal of said other means through said slot means upon the release of said first end portions from said member, respectively.

4. A frriction device for use with a rotatable disc comprising support means, a pair of friction elements respectively disposed on opposed sides of said disc for frictional engagement therewith, a closed loop member movable on said support means and surrounding said friction elements and a chordal portion of said disc, said member including actuating means for effecting movement of said friction elements into frictional engagement with said disc, and a pair of holding means for at least one of said friction elements extending across the periphery of said disc and engaging said one friction element to limit displacement movement thereof radially of said disc, said holding means each having one end portion releasably engaged with said member adjacent to one side of said disc, a pair of slot means extending through said member adjacent to the other side of said disc, said holding means each having other opposed end portions extending through said slot means, and other means on said other end portions for engagement with said member to prevent removal of said other end portions through said slot means when said holding means are engaged with said one friction element, said holding means being pivotally movable toward positions disengaged from said one friction element to permit removal thereof from said friction device and also to permit the removal of said other end portions and other means through said slot means upon the release of said one end portions from engagement with said member, respectively.

5. A friction device according to claim 4, comprising a pair of opposed recesses respectively in the opposed ends of said one friction element, said holding means being respectively received in said recesses in radial displacement preventing engagement with said one friction element, other slot means in said other friction element and slidably received on said member in radial displacement preventing engagement therewith, and a pair of other abutment means on said holding means and engaged with said other friction element to limit axial displacement movement thereof relative to said member when said holding means are received in said recesses, said holding means being disengaged from said recesses and said other abutment means being disengaged from said other friction element to permit removal of said one and other friction elements from said friction device upon the pivotal movement of said holding means toward their pivotally displaced positions, respectively.

References Cited

UNITED STATES PATENTS

| | | | |
|---|---|---|---|
| 3,166,156 | 1/1965 | Burnett et al. | 188—73 |
| 3,166,158 | 1/1965 | Burnett et al. | 188—73 |
| 3,245,500 | 4/1966 | Hambling et al. | 188—73 |
| 3,375,906 | 4/1968 | Hayes | 188—73 |

FOREIGN PATENTS 1,431,782   2/1966   France.

GEORGE A. HALVOSA, Primary Examiner